United States Patent
Weaver

(10) Patent No.: US 7,769,240 B2
(45) Date of Patent: Aug. 3, 2010

(54) METHODS AND SYSTEMS FOR IMAGE PROCESSING

(75) Inventor: Timothy H. Weaver, Atlanta, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 842 days.

(21) Appl. No.: 11/703,352

(22) Filed: Feb. 7, 2007

(65) Prior Publication Data

US 2008/0189751 A1 Aug. 7, 2008

(51) Int. Cl.
*G06K 9/32* (2006.01)

(52) U.S. Cl. .................. 382/254; 382/274; 382/275; 382/299

(58) Field of Classification Search ............. 382/260, 382/274, 275, 299; 348/14.1, 14.12, 14.14
See application file for complete search history.

(56) References Cited

U.S. PATENT DOCUMENTS

| | | | |
|---|---|---|---|
| 6,680,752 B1 * | 1/2004 | Callway et al. ............. 348/448 |
| 6,788,823 B2 * | 9/2004 | Allred et al. ................ 382/260 |
| 6,847,391 B1 * | 1/2005 | Kassatly .................. 348/14.01 |
| 7,039,110 B2 * | 5/2006 | Ernst et al. ............. 375/240.16 |
| 7,197,075 B2 * | 3/2007 | Akimoto et al. ......... 375/240.16 |

* cited by examiner

*Primary Examiner*—Yosef Kassa
(74) *Attorney, Agent, or Firm*—Cantor Colburn LLP

(57) ABSTRACT

Variable video stream delivery tools include methods and systems that detect activation of a zoom command during presentation of a first stream of data to a multimedia device and that selectively supplants a second stream of data having a higher resolution for a zoomed image plane of the first stream of data in order to conserve bandwidth. Further exemplary embodiments detect activation of a rotational command and that refreshes the second stream of data with a zoomed, spherical-panorama presentation. And, further exemplary embodiments enable restoration of the first stream of data. These tools may be utilized during presentation of media content, when the media content is initially ordered, or when future presentation of media content is selected to record.

20 Claims, 13 Drawing Sheets

METHODS AND SYSTEMS FOR IMAGE PROCESSING

CROSS REFERENCE TO RELATED APPLICATIONS

This application relates to the following co-pending and commonly-assigned applications, with each application incorporated herein by reference: U.S. application Ser. No. 11/300,125, filed Dec. 14, 2005 and entitled "Presence Detection in a Bandwidth Management System"); U.S. application Ser. No. 11/300,061, filed Dec. 14, 2005 and entitled "Methods, Systems, and Devices for Bandwidth Conservation"; U.S. application Ser. No. 11/178,075, filed Jul. 8, 2005 and entitled "Methods, Systems, and Devices for Securing Content"; U.S. application Ser. No. 11/304,264, filed Dec. 14, 2005 and entitled "Methods, Systems, and Computer Program Products For Providing Traffic Control Services"; U.S. application Ser. No. 11/703,573, concurrently filed and entitled "Methods, Systems, and Products for Conserving Bandwidth"; U.S. application Ser. No. 11/413,886, concurrently filed and entitled "Methods, Systems, and Products for Recording Media"; U.S. application Ser. No. 11/413,885, concurrently filed and entitled "Methods, Systems, and Products for Recording Media"; U.S. application Ser. No. 12/726,441, concurrently filed and entitled "Methods, Systems, and Products for Targeting Media"; and U.S. application Ser. No. 12/630,895, concurrently filed and entitled "Methods, Systems, and Products for Restoring Media".

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to distributing video data streams having varying resolutions in such systems.

Multimedia streaming systems are limited by wireless bandwidth and multimedia delivery systems. For example, each subscriber's multimedia device may have different display formats, power settings, communications capabilities, and computational capabilities. Still further, each content distribution network that delivers or otherwise communicates media content to the multimedia device may have different maximum bandwidths, quality levels, time-varying characteristics, delivery reliability features, and delivery costs. And, as subscribers demand more and more content, higher definition services, interactive services, and data services, the existing network infrastructures have trouble supplying and utilizing adequate bandwidth. The industry is hard at work identifying new ways of utilizing bandwidth. The industry is also striving to reduce wasted bandwidth.

Conventional interactive multimedia distribution systems make use of a display device (coupled or otherwise integrated with the multimedia device) for presentation of video and/or graphical content. In order to enlarge or otherwise "zoom" to a selected image of the video and/or graphical content, the selected area is targeted and presented on the display device at a higher magnification. However, if an image plane becomes larger on the display device and the number of display pixels in a longitudinal direction is the same as that in a lateral direction, then the space between the pixels becomes larger. And, the displayed resolution appears lowered, thus the "definition" of the zoomed, selected image is lowered for a subscriber viewing the display device.

Consequently, the subscriber may desire to raise horizontal and vertical scanning frequencies of the video and/or graphical images to implement a higher resolution of the zoomed, selected image to the display device and provide an improved definition of the selected image plane. However, as briefly mentioned above, high-grade delivery techniques and increased costs are typically required to raise the quality of the image plane.

Accordingly, needs exist for image processing systems and methods that enable video or graphical data enlargement (i.e., "zooming") to the display device and that also effectively leverage higher resolution data streams. Similarly, needs exist for image processing systems and methods to selectively control image plane presentation of zoomed content. Still further, a need exists for image processing systems and methods that recapture a lower resolution data stream of the video or graphical data when the zoom feature is deactivated.

SUMMARY

The aforementioned problems, and other problems, are addressed, according to exemplary embodiments, by methods, systems, and devices that conserve bandwidth in communications networks. These exemplary embodiments describe tools that can reduce the occurrences of wasted bandwidth. Because each subscriber's multimedia device may have limited presentation capabilities and because each content distribution network may have different maximum bandwidths and delivery features, these exemplary embodiments selectively upgrade resolution of multimedia content when the subscriber activates commands to zoom and/or to pan the displayed content. If the zoom and/or pan command is deactivated, then the exemplary embodiments restore standard resolution of a stream of data for the multimedia content. According to exemplary embodiments, the standard resolution data stream may be supplanted with the upgraded resolution data stream. And, further exemplary embodiments degrade the standard resolution data stream during presentation of the upgraded resolution data stream (e.g., multiple data streams may be delivered and selectively filtered for presentation according to selection and use of the zoom command and/or pan command.)

The exemplary embodiments conserve bandwidth. A standard resolution is predetermined for the delivery of multimedia content to a multimedia device. During presentation of the data stream having the predetermined, standard resolution (also referred to herein as the "standard data stream"), if the zoom command is activated, then an upgraded stream of data (also referred to herein as the "upgraded data stream") having a higher resolution for a zoomed image plane supplants the standard data stream and the upgraded data stream is delivered to the multimedia device over a content distribution network. And, if during delivery of the upgraded data stream, the pan command is activated, then the upgraded data stream is refreshed for zoomed, spherical panorama presentation to the multimedia device (also referred to herein as the "refreshed data stream"). When the zoom command and/or the pan command are deactivated or when a restoration command is detected, the standard resolution stream of data may be restored (also referred to herein as the "restored data stream") such that available bandwidth is conserved.

According to alternative exemplary embodiments, the content distribution network may deliver multiple data streams having different resolutions, such that the multimedia device itself and/or a local network component (e.g., a residential gateway) controls selection and presentation of either the standard data stream or the upgraded data stream.

Some of the exemplary embodiments include a device that conserves bandwidth. The device comprises a processor communicating with means for detecting a zoom command. The processor commands communication of a first stream of data for presentation to a multimedia device. According to some of the embodiments, the resolution of the first stream of data is predetermined based upon the capabilities of the multimedia device and/or the capabilities of the content distribution network. When the zoom command is activated, the processor accesses a second stream of data for a zoomed image plane of the first stream of data and commands communication of the second stream of data for presentation to the multimedia device. This second stream of data has a higher resolution of the zoomed image plane such that the definition of the zoomed image plane is comparable or better to the definition of the full image plane of the first stream of data. The processor may then degrade, discontinue, or otherwise discard the first stream of data during presentation of the upgraded data stream. When the zoom command is deactivated or when a restoration command is detected, the processor restores the standard data stream. Consequently, the device controls selection and delivery of media content having variable data streams of different resolutions to conserve bandwidth.

Further exemplary embodiments describe a computer program product for conserving bandwidth. The computer program product comprises a computer-readable medium and a zoom and pan application stored on the computer-readable medium. The zoom and pan application includes instructions for: i) displaying a first video stream having a sequence of frames of video data, each frame having an image plane with a predetermined image pixel density wherein the image pixel density comprises an x-dimension of a predetermined number of pixels and a y-dimension of a predetermined number of pixels, ii) detecting a zoom command from the multimedia device, the zoom command comprising an instruction to magnify a selected portion of the image plane, iii) supplanting the first video stream with a second video stream having a synchronized sequence of zoomed frames for the selected portion of image plane, each zoomed frame having a higher image pixel density than the predetermined pixel density of the first video stream for the selected portion of the image plane, wherein the higher image pixel density comprises an x-dimension of an increased number of pixels for the selected portion of the image plane and a y-dimension of an increased number of pixels for the selected portion of the image plane, and iv) displaying the second video stream.

Other systems, methods, and/or computer program products according to the exemplary embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

These and other features, aspects, and advantages of the exemplary embodiments are better understood when the following description is read with reference to the accompanying drawings, wherein.

DESCRIPTION

Figure 1:
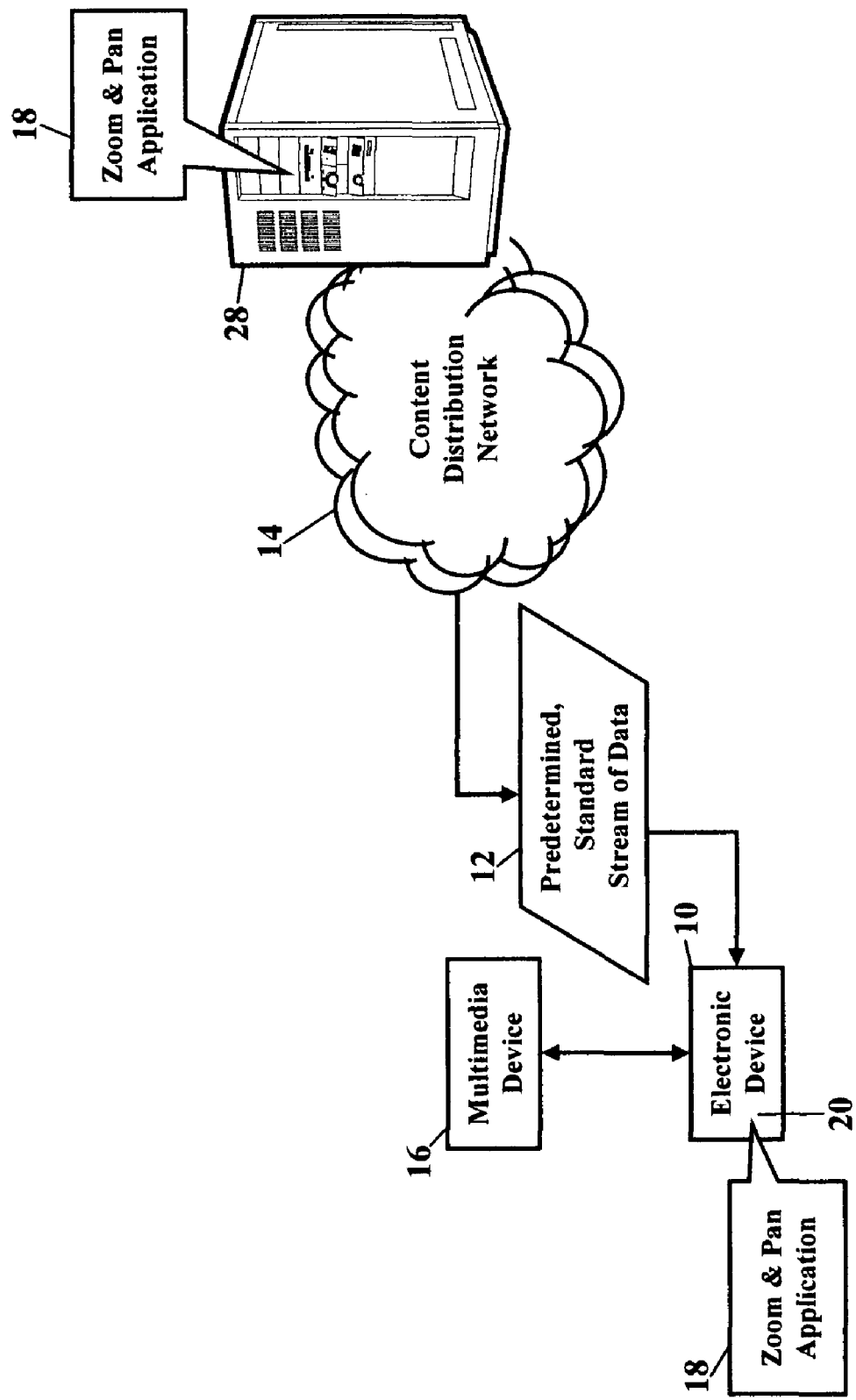
FIGS. 1-6 are schematics illustrating image control detection, acquisition of a high resolution data stream, and/or restoration according to exemplary embodiments.

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

Operating environment for efficient and effective video streaming provide many distribution challenges. For instance, each multimedia device may have limited presentation capabilities. In addition, each content distribution network may have different maximum bandwidths and delivery features (e.g., quality levels, time varying features, etc.). The exemplary embodiments describe methods, systems, and devices that conserve bandwidth in a communications network by selectively distributing variable multimedia streaming resolutions of multimedia content. These exemplary embodiments describe how to reduce the occurrences of wasted bandwidth within a content distribution network to a multimedia device of an end user (e.g., a content service provider's communication of multimedia content to an Internet Protocol television of a subscriber or user). As used herein, the terms "end user," "subscriber," and "individual" are used to describe one or more persons that actively (e.g., by entering commands into the multimedia device or by entering commands to an electronics device integrated with or otherwise coupled to the multimedia device) or passively (e.g., by sensing a presentation of media to the multimedia device) interact with the multimedia device.

According to some of the embodiments, a standard resolution of the multimedia content is predetermined for delivery of the video stream to the multimedia device (e.g., near real-time available bandwidth may be used to determine the "standard data stream"). During presentation of the standard data stream, if the zoom command is activated, then an upgraded stream of data (also referred to herein as the "upgraded data stream") having a higher resolution for a zoomed image plane supplants the standard data stream and the upgraded data stream is delivered to the multimedia device over the content distribution network. And, if during delivery of the upgraded data stream, the pan command is activated, then the upgraded data stream is refreshed for zoomed, spherical-panorama presentation to the multimedia device (also referred to herein as the "refreshed data stream"). Alternatively, the content distribution network may deliver multiple data streams having different resolutions, such that the multimedia device itself and/or a local network component (e.g., a residential gateway) controls selection and presentation of either the standard data stream or the upgraded data stream. Further exemplary embodiments describe restoration. That is, when the zoom command and/or the pan command is deactivated or when a restoration command is detected, the standard resolution stream of data may be restored (also referred to herein as the "restored data stream") such that available bandwidth is conserved.

FIGS. 1-6 are schematics illustrating operating environments according to some of the exemplary embodiments. FIG. 1 shows a content distribution network (also referred to as a "communications network") 14 that distributes a predetermined resolution of a standard stream of data 12 (also referred to as the "standard data stream") to a multimedia gateway device 10. The multimedia gateway device 10 communicates the standard data stream 12 to a multimedia presentation device 16. The multimedia gateway device 10 includes a computer program product referred to as a zoom and pan application 18. According to exemplary embodiments, the zoom and pan application 18 detects an image control command, such as a zoom command or a pan command. Further, the content distribution network 14 includes one or more databases or servers 28 of multimedia content for delivery to the multimedia gateway device 10 and for display to the multimedia presentation device 16.

The multimedia presentation device 16 can be any device, such as a set-top box, a television, or an integrated television and set-top box. The multimedia presentation device 16 may be coupled or otherwise integrated with the multimedia gateway device 10, or, alternatively, the multimedia presentation device 16 may be a stand-alone device. The multimedia presentation device 16 may also be an analog/digital recorder, CD/DVD player/recorder, audio equipment, receiver, tuner, and/or any other consumer electronic device. The multimedia presentation device 16 may include any computer, peripheral device, camera, modem, storage device, telephone, personal digital assistant, and/or mobile phone. The standard data stream 12 may be any RF and/or digital content, such as television/cable programming, mpg streams, or any other electronic content. The content distribution network 14 may be a cable network operating in the radio-frequency domain and/or the Internet Protocol (IP) domain. The content distribution network 14, however, may also include a distributed computing network, such as the Internet (sometimes alternatively known as the "World Wide Web"), an intranet, a local-area network (LAN), and/or a wide-area network (WAN). The content distribution network 14 may include coaxial cables, copper wires, fiber optic lines, and/or hybrid-coaxial lines. The content distribution network 14 may even include wireless portions utilizing any portion of the electromagnetic spectrum and any signaling standard (such as the I.E.E.E. 802 family of standards).

As shown in FIG. 1 and in FIGS. 2-6, the multimedia gateway device 10 detects or otherwise monitors for an image control command. According to exemplary embodiments, the zoom and pan application 18 is a computer program that processes information to and from the multimedia gateway device 10 to monitor image control commands of the multimedia presentation device 16. For example, the multimedia gateway device 10 may detect a zoom command 26 to magnify a selected portion of an image frame for the multimedia content, a pan command 27 to rotate or otherwise alter a center position of the image frame, and a restore command 29 to degrade a higher resolution multimedia stream of data to the resolution of the standard data stream 12. The zoom and pan application 18 may be stored in memory 20 of the multimedia gateway device 10 or in a memory component of the network server 28. If the multimedia gateway device 10 receives electrical power from the multimedia presentation device 16, then the zoom and pan application 18 may also monitor a state of the multimedia presentation device 16, such as an electrically-powered "on" or "off" state to determine whether to monitor the multimedia presentation device 16 for an image control command.

The multimedia gateway device 10 may itself be any electronic device having an emitter, a detector, and/or a processor. The multimedia gateway device 10 and the multimedia presentation device 16 may have a master-slave relationship, a peripheral relationship, or a component relationship. The multimedia gateway device 10 may itself be a set-top box, a television, or an integrated television and set-top box. The multimedia gateway device 10 may also be an analog/digital recorder, CD/DVD player/recorder, audio equipment, receiver, tuner, and/or any other consumer electronic device. The multimedia gateway device 10 may also include any computer, peripheral device, camera, modem, storage device, telephone, personal digital assistant, and/or mobile phone.

According to exemplary embodiments, the zoom and pan application 18 conserves bandwidth. The zoom and pan application 18 determines when high bandwidth needs to be allocated to the multimedia presentation device 16 (via multimedia gateway device 10) for activation of a zoom command (shown as reference numeral 26 in FIG. 3) and/or a pan command (shown as reference numeral 27 in FIG. 4). As the following paragraphs will explain, when the zoom and pan application 18 detects the zoom command and/or the pan command, then the standard data stream 12 may be supplanted with a high-bandwidth stream of data (shown as reference numerals 46 and 47 of respective FIGS. 3 and 4) from the content distribution network 14. Further, the zoom and pan application 18 may degrade the high-bandwidth stream of data to the standard data stream 12 upon detection of the restore command 29 or upon deactivation of the zoom command and/or the pan command. Because the resolution of the multimedia data streams (reference numerals 12, 46, and 47) are selectively controlled according to actual detection of image control commands, bandwidth is ultimately conserved.

Figure 2:
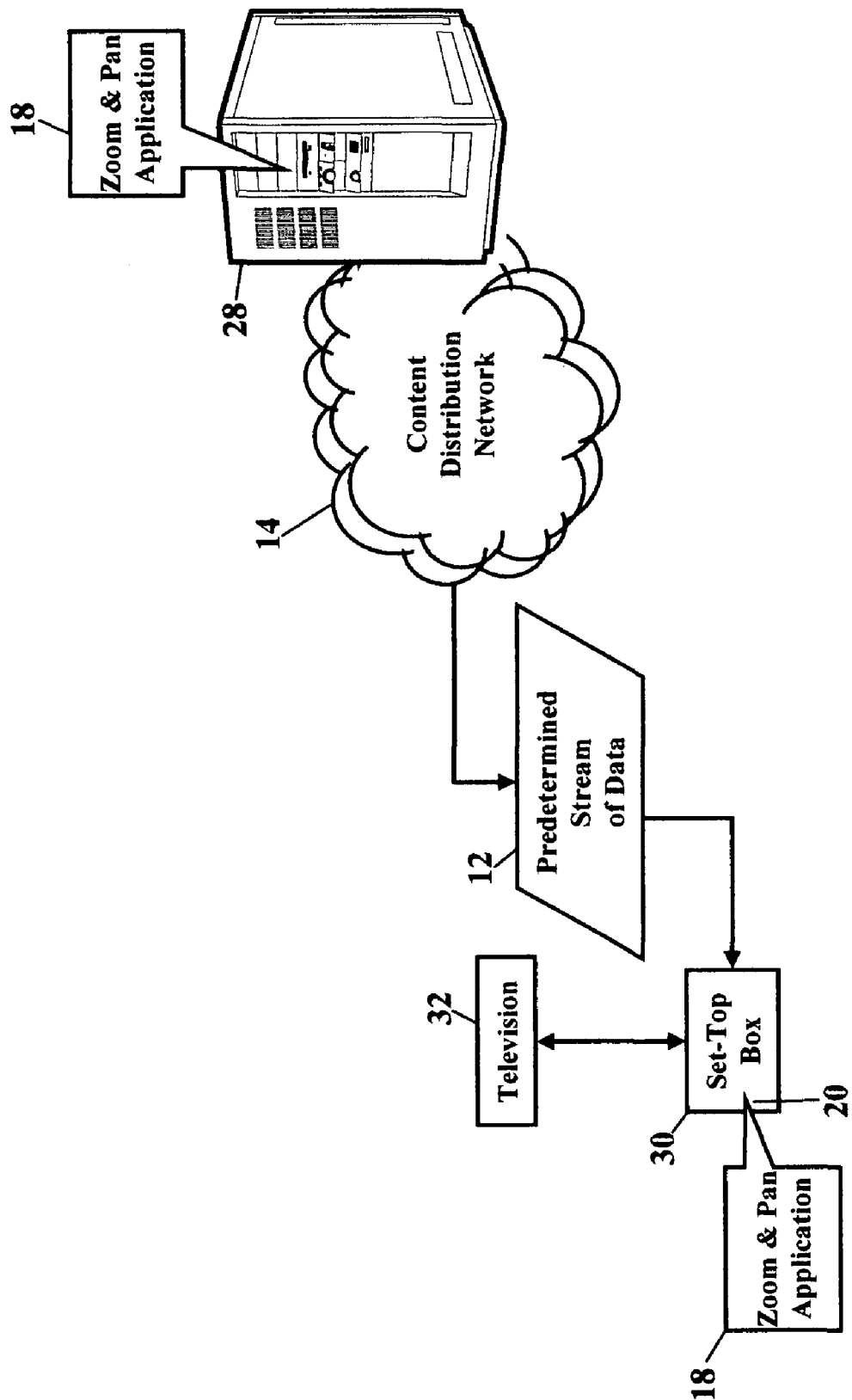
Figure 3:
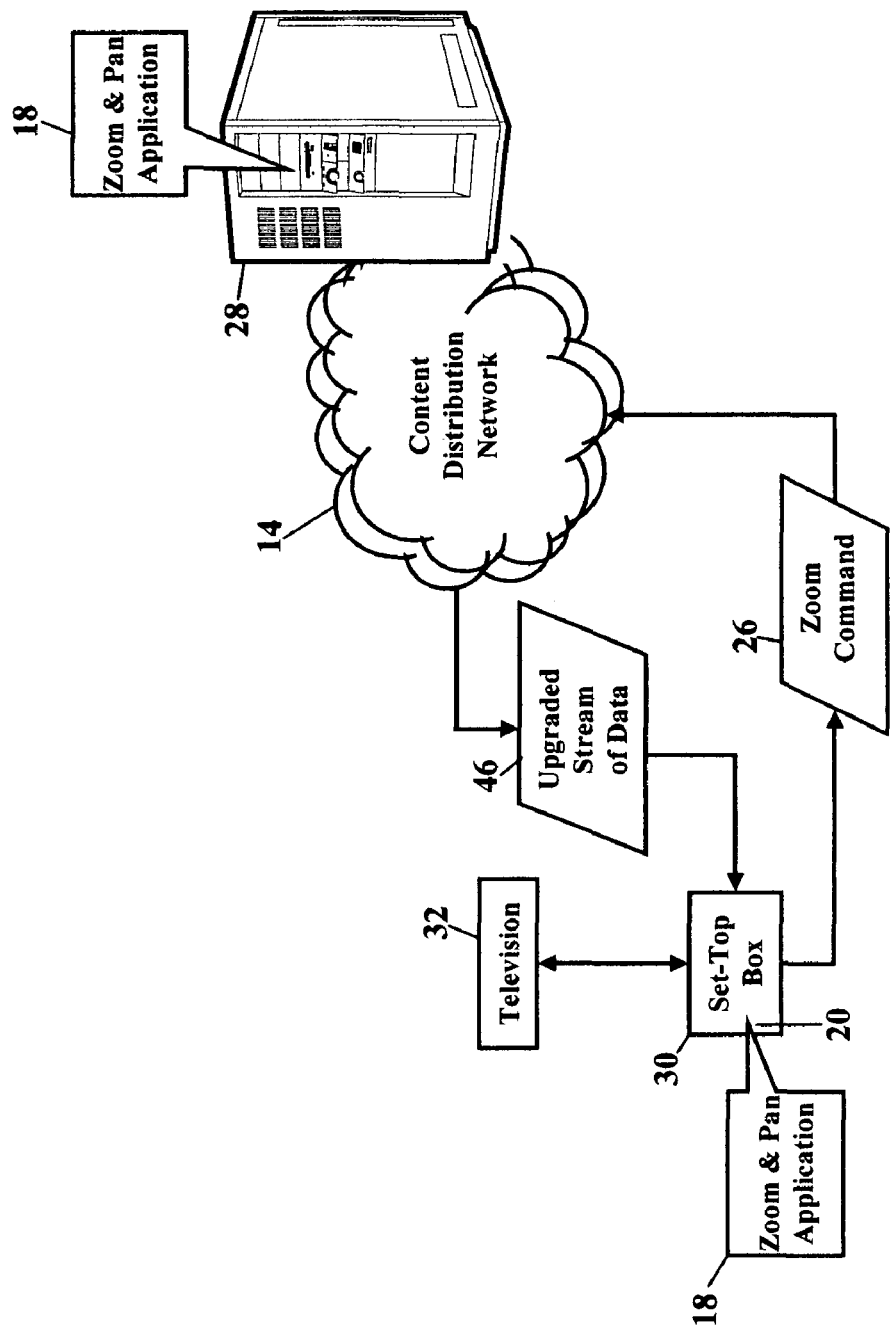
Figure 4:
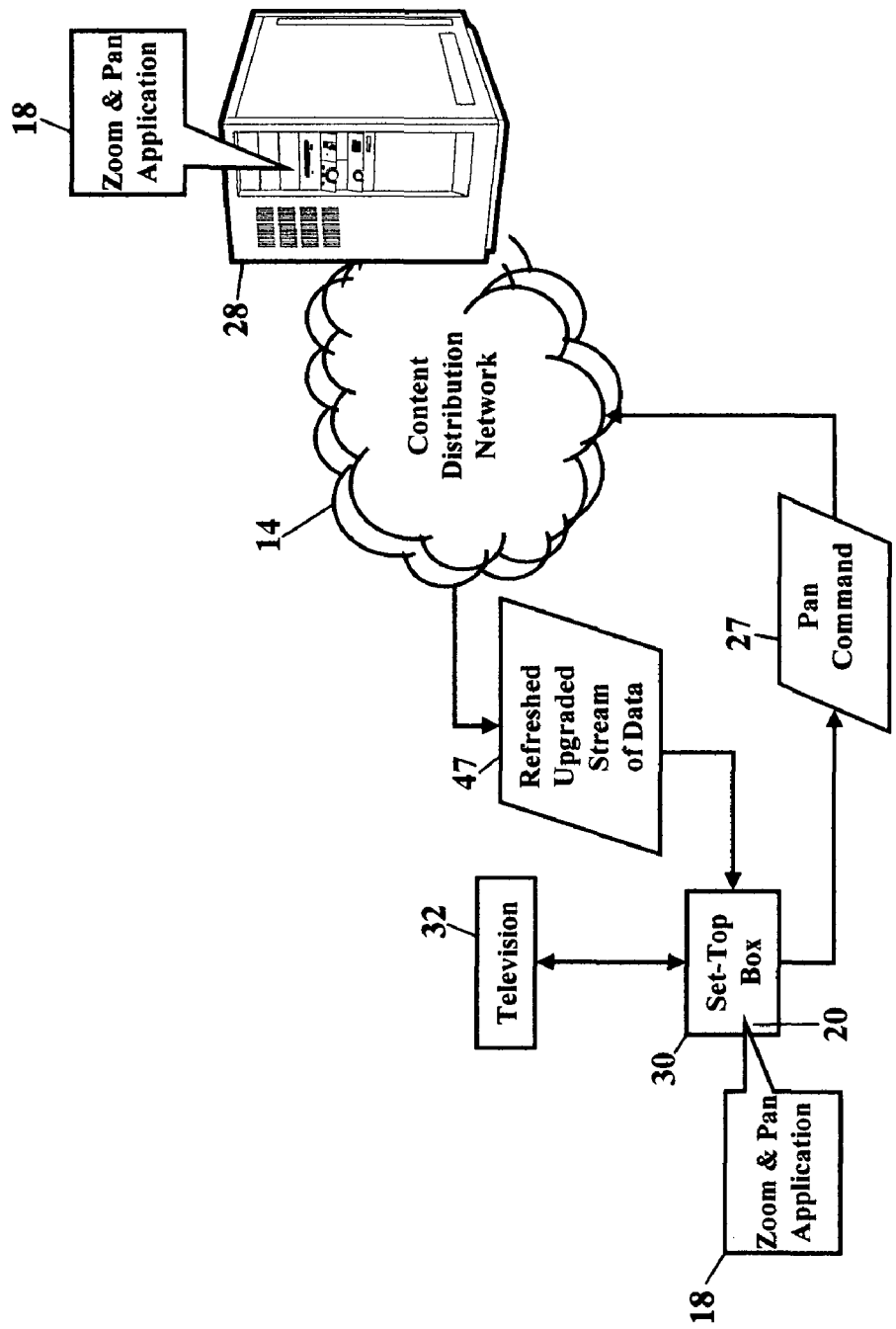

Referring now to an example of image control detection, acquisition of a high resolution data stream, and/or restoration, FIG. 1 shows the multimedia gateway device 10 receiving the standard data stream 12 from the content distribution network 14 and communicating the standard data stream 12 to the multimedia presentation device 16. FIG. 2 illustrates the multimedia gateway device as a set-top box 30 interacting with the zoom and pan application 18 to detect an image control command such that the zoom and pan application 18 interfaces with the multimedia presentation device shown as a television 32 to communicate an alternate stream of data having a different resolution in response to the image control command. For example, FIG. 3 illustrates the zoom command message 26. When the zoom command 26 is detected, then there is a need to magnify a selected portion of an image plane. If the display of the image plane becomes larger and a number of display pixels (i.e., the number of dots) in a longitudinal direction is the same as that in a lateral direction, the space between the pixels becomes larger and the apparent resolution (also referred to herein as "definition") of the selected portion of the image plan is lowered for a subscriber viewing the selected portion of the image plane. Consequently, it is desirable to increase horizontal and vertical scanning frequencies in order to display the selected portion of the image plane with a better definition. Accordingly, the zoom and pan application 18 sends the zoom command message 26 to the server 28 via the set-top box 30 and the content distribution network 14. The zoom command message 26 instructs the corresponding server-based component of the zoom and pan application 18 to access and distribute the upgraded data stream 46 having a higher resolution such that the upgraded stream of data 46 is processed and communicated from the server 28 to the set top box 30 and communicated from the set top box 30 to the television 32. The upgraded data stream 46 typically has an increased data rate measured in bytes per second. Similarly, FIG. 4 illustrates the pan command message 27. When the pan command 27 is detected, then there is a need to refresh the orientation of the center position of an image plane. Accordingly, the zoom and pan application 18 sends the pan command message 27 to the server 28 via the set-top box 30 and the content distribution network 14. The pan command message 27 instructs the corresponding server-based component of the zoom and pan application 18 to access and distribute the refreshed, upgraded data stream 47 having a higher resolution such that the refreshed, upgraded stream of data 47 is processed and communicated from the server 28 to the set top box 30 and communicated from the set top box 30 to the television 32. The refreshed, upgraded data stream 47 typically has an increased data rate measured in bytes per second.

Figure 5:
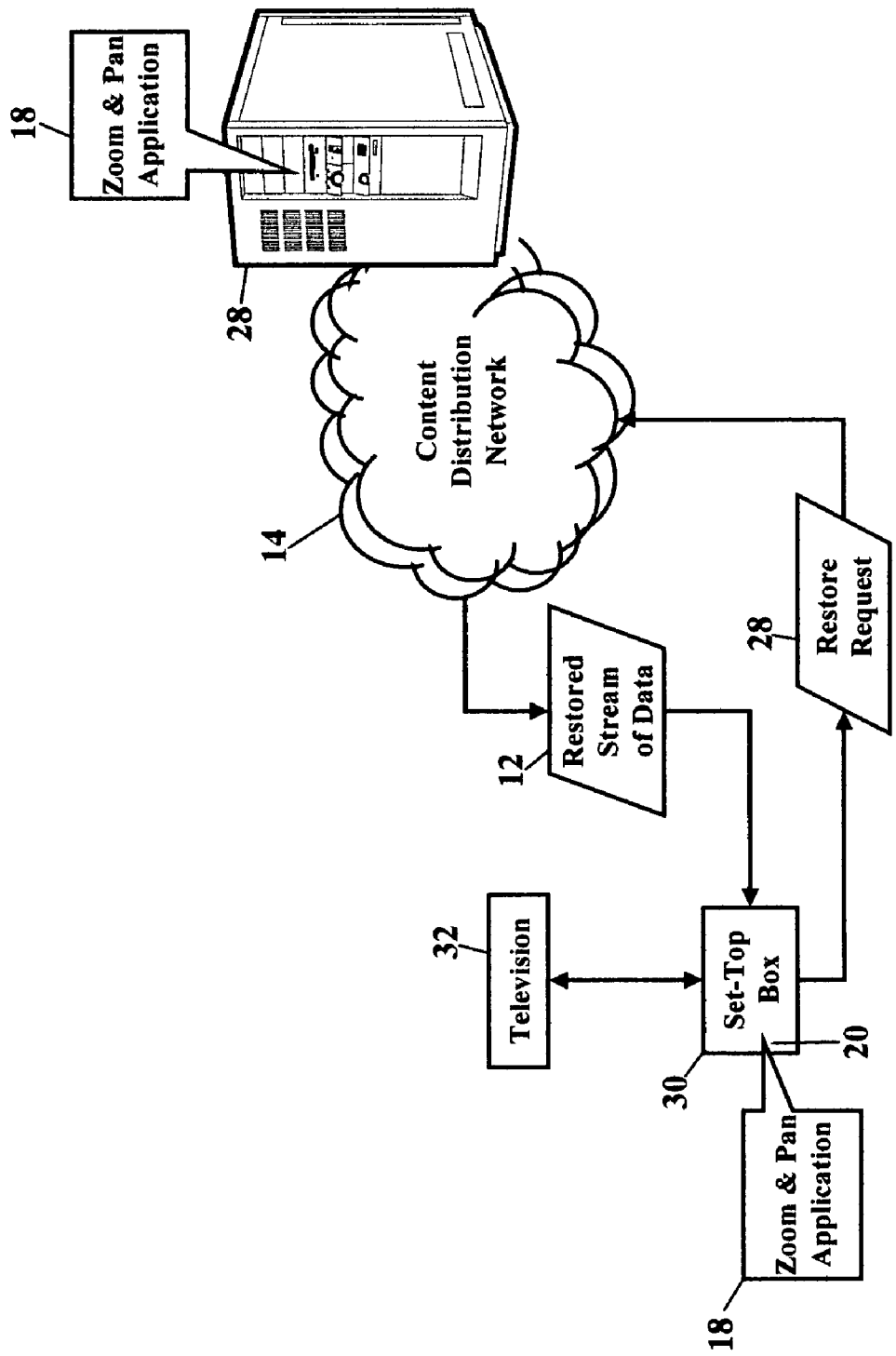

FIG. 5 is a schematic illustrating restoration of the standard data stream 12 according to exemplary embodiments. The zoom and pan application 18 may continually monitor deactivation of the zoom command and/or the pan command to the television 32 or for an input to the set-top box 30. When the zoom command and/or pan command is deactivated, or, alternatively, when a restoration command 28 is detected, then the zoom and pan application 18 causes a degradation in the data rate (e.g., bytes per second) and restores the standard data stream 12. The zoom and pan application 18 sends the restoration command message 28 to the server 28, and the restoration command message 28 instructs the server-based zoom and pan application 18 to restore the standard data stream 12. Because the restored, standard data stream 12 has a reduced data rate, the bandwidth allocated to the television 32 and/or to the set-top box 30 is reduced and reallocated to other uses within the content distribution network 14 and/or within a home network (shown as reference numeral 51 of FIG. 8).

Figure 6:
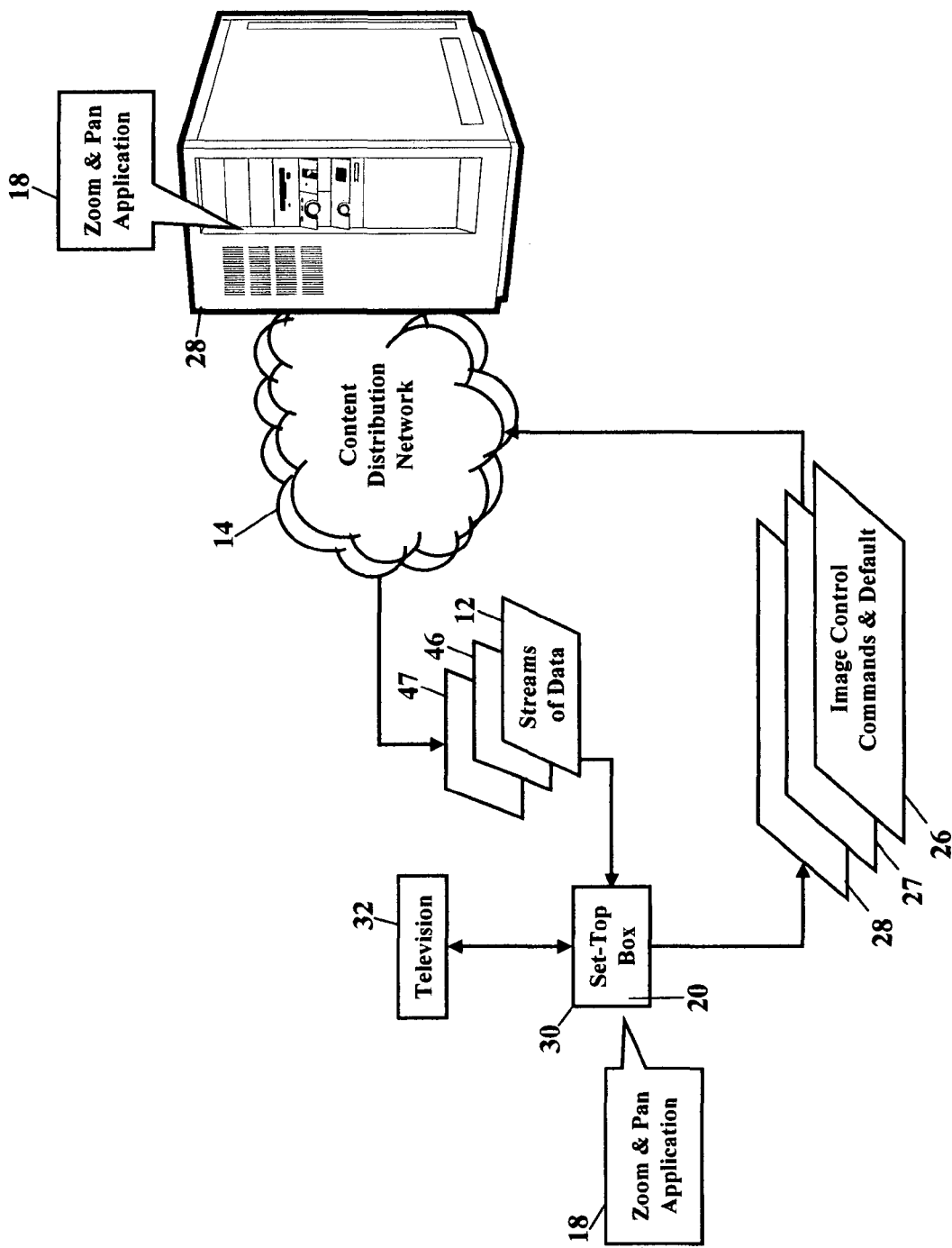

FIG. 6 is a collective schematic illustrating image control detection, acquisition of a high resolution data stream, and/or restoration according to the exemplary embodiments of FIGS. 2-5. According to the exemplary embodiments of FIG. 6, the zoom and pan application 18 of server 28 may distribute a plurality of data streams 12, 46, and 47 that may be filtered by the zoom and pan application 18 of the set-top box 30 for delivery of the data stream 46, 47, and 12 in response to the most recent respective image control command 26, 27, and 28.

Figure 7:
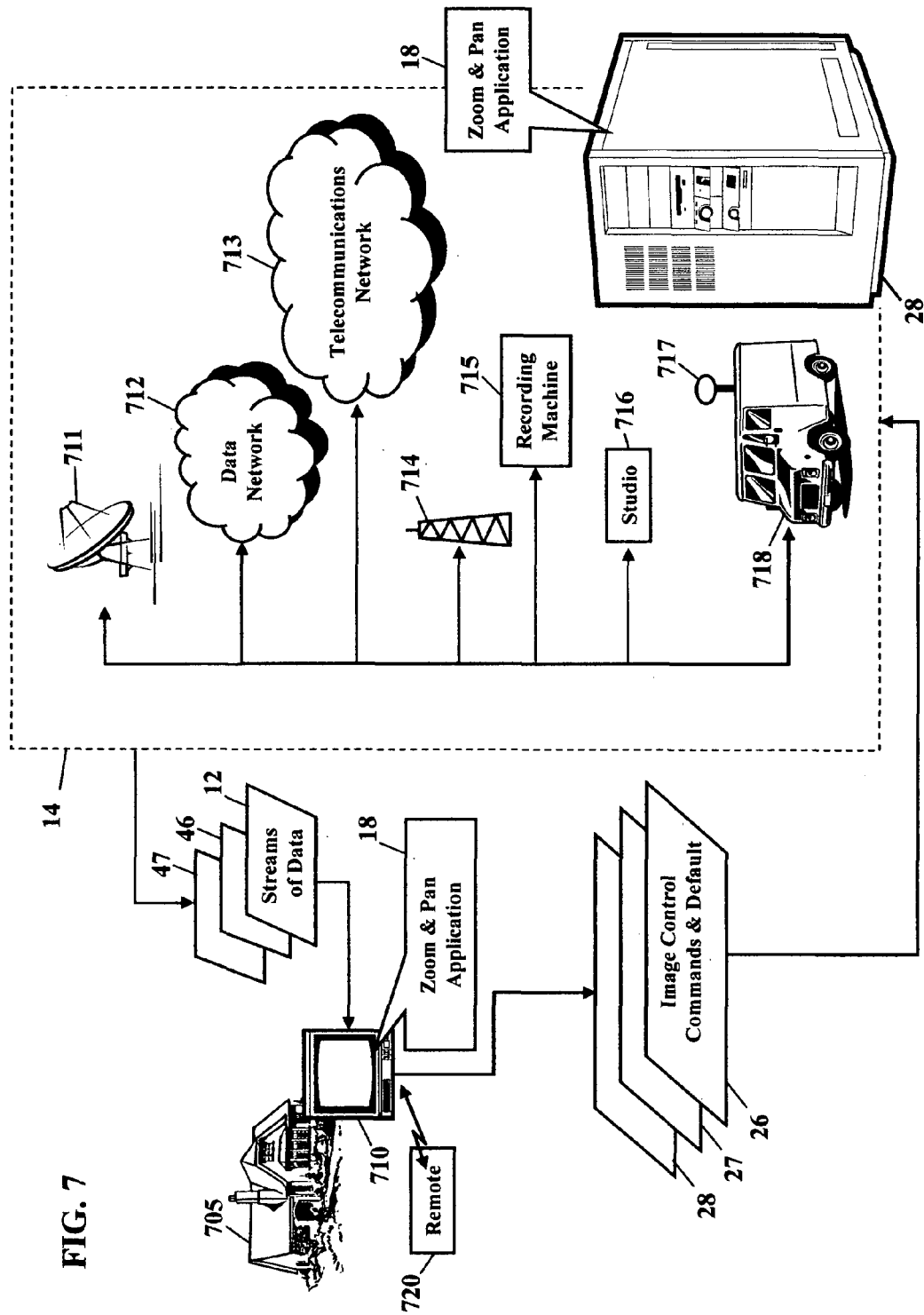
FIG. 7 is a schematic illustrating image control detection, acquisition of a high resolution data stream, and/or restoration according to further exemplary embodiments.

FIG. 7 is a schematic illustrating an operating environment according to other exemplary embodiments. FIG. 7 shows an alternate home network (also referred to as a "local area network") 705 that does not include the multimedia gateway device 10 shown in FIGS. 1-6. The multimedia presentation device itself of home network 705 directly communicates with the content distribution network 14 to send image control commands 26, 27, and 28 and to receive the data stream 46, 47, and 12 in response to the most recent respective image control command 26, 27, and 28. The multimedia presentation device is shown as a television integrated with a set-top box 710 having the zoom and pan application 18. The integrated device 710 detects or otherwise monitors for an image control command 26, 27, and 28 and operates with the zoom and pan application 18 to control or otherwise manage communications of the respective data streams 46, 47, and 12. For example, a remote control 720 may communicate the image control command 26, 27, and 28 to the integrated device 710. As shown in FIG. 7, these broadcast systems may include a direct digital broadcast via satellite TV 711, a communication link with a data communications network 712, a communications link with a telecommunication network 713, a broadcast via digital cable TV 714, and/or a terrestrial broadcast analog and/or digital TV such as a broadcast from a recording device 715, a studio 716, or a mobile vehicle 718 with an antenna and receiver 717. Further, the zoom and pan application 18 may interact with a directory-on-demand service (or an alternate source that provides access to and other command options (e.g., record options) for the program) via a web browser or alternate interface to present a menu to the multimedia presentation device 16. If the zoom and pan application 18 uses the web browser, then an application server may respond to Hyper-Text Transfer Protocol (HTTP) requests by processing the requested URL and parameters according to the services it is providing. This may require accessing and/or storing data in a server database. According to another exemplary embodiment, Real Simple Syndication (RSS) that uses XML structures may be similarly used to feed the program and related information.

Figure 8:
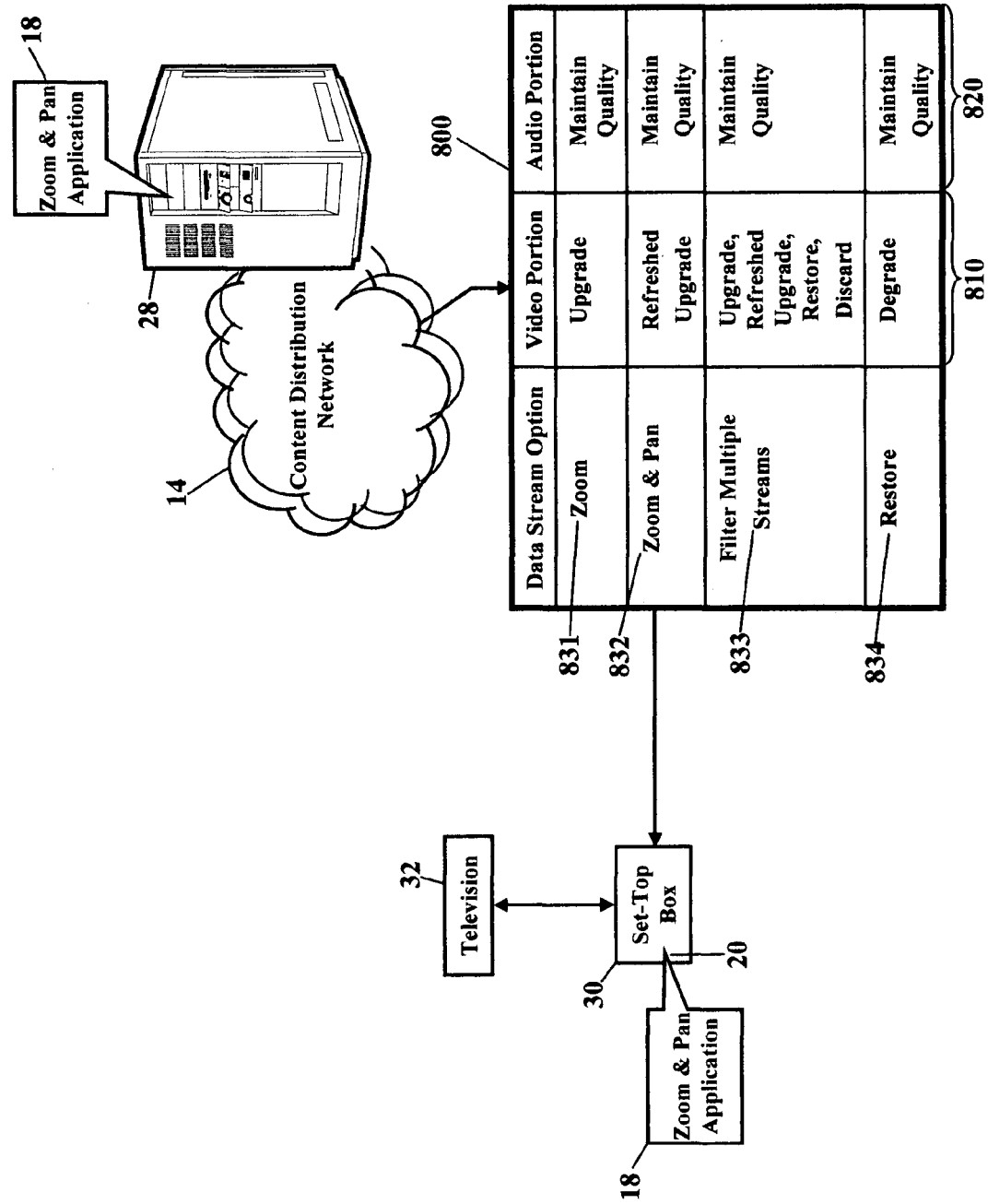
FIG. 8 illustrates exemplary options for the high resolution and restoration data streams described in the exemplary embodiments of FIGS. 1-7.

FIG. 8 includes a detailed table 800 illustrating the data stream control command options that are communicated to the content distribution network 14 and to the server 28 according to exemplary embodiments. The image control commands include instructions for selecting a resolution of the audio, video, and/or data components of the available streams of data (shown as reference numerals 12, 46, and 47 in FIGS. 1-7, 9, 13, and 14). That is, the zoom and pan application 18 accesses and distributes a video portion 810, an audio portion 820, and/or a data portion of the data stream communicated to the set-top box 30.

As FIG. 8 illustrates, a first image control command option 831 upgrades the video portion 810, maintains the quality of the audio portion 820, and maintains, degrades, or discards the data portion. Consequently, the first image control command option 831 may result with presentation of a higher resolution of the selected portion of the image frame with audio quality that is maintained as the video image operations are performed. Further, the first image control command option 831 may present the upgraded video portion 810 with additional data and/or an image, such as an alert that the multimedia session is available in a high resolution display format (as shown in reference numeral 1130 of FIG. 11), a navigation tool (e.g., a programming guide), and/or alternate alphanumeric data such as weather information, stock market quotes, and other data. A second image control command option 832 refreshes the upgraded video portion 810 of the option 832 and maintains the quality of the audio portion 820. The second image control command option 832 may result in shifting a center position of the selected portion of the image plane displayed in the option 832 with the maintained quality of the audio portion 820. A third image control command option 833 distributes a plurality of video streams having either an upgraded or degraded video portion 810 and maintains the quality audio portion 820 such that the set-top device 30 (or alternatively a home network component) filters and presents an appropriate video portion and maintains quality of the audio stream. A fourth image control command option 834 degrades the video portion 810 and maintains the audio portion 820, and maintains, degrades, and/or discards the data portion. The fourth image control command option 834 conserves the most bandwidth. Because the fourth image control option 834 may conserve the most bandwidth, the fourth option 834 may be established as a default. That is, unless the zoom and pan application 18 is otherwise configured by an individual (e.g., the subscriber or an authorized user); the zoom and pan application 18 automatically requests and/or delivers the standard data stream 12.

Figure 9:
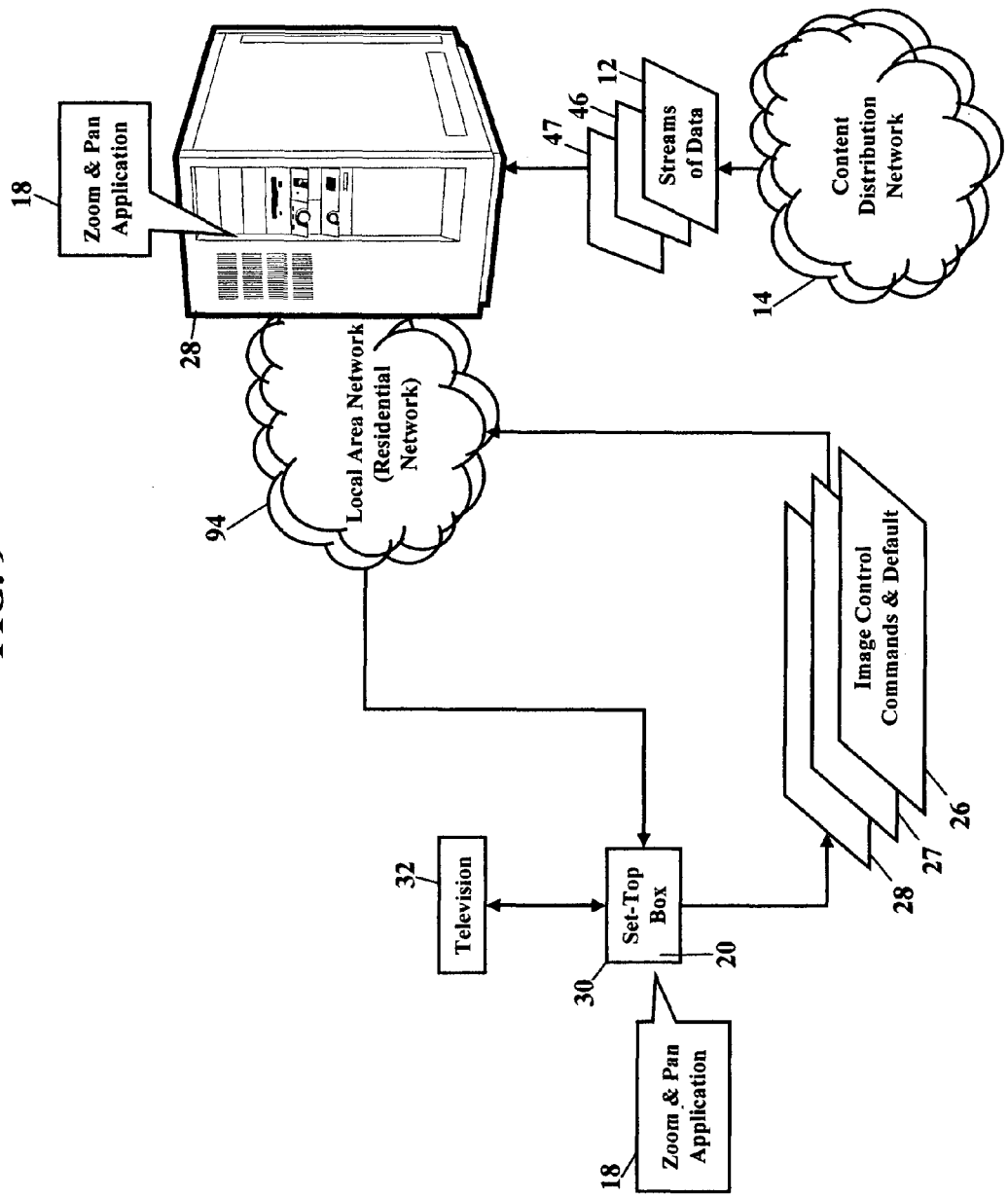
FIG. 9 is a schematic illustrating image control detection, acquisition of a high resolution data stream, and/or restoration according to yet further exemplary embodiments.

Referring now to FIG. 9, an alternate home network (also referred to as a "local area network" or a "residential gateway") 94 interfaces with the content distribution network 14 to communicate the image control commands 26, 27, and 28. In response to receiving the image control commands 26, 27, and 28, the content distribution network 14 distributes the respective data stream 46, 47, and 12 to the home network 94. The home network 94 then distributes the respective data stream 46, 47, or 12 to the set-top box 30 for presentation to television 32

Figure 10:
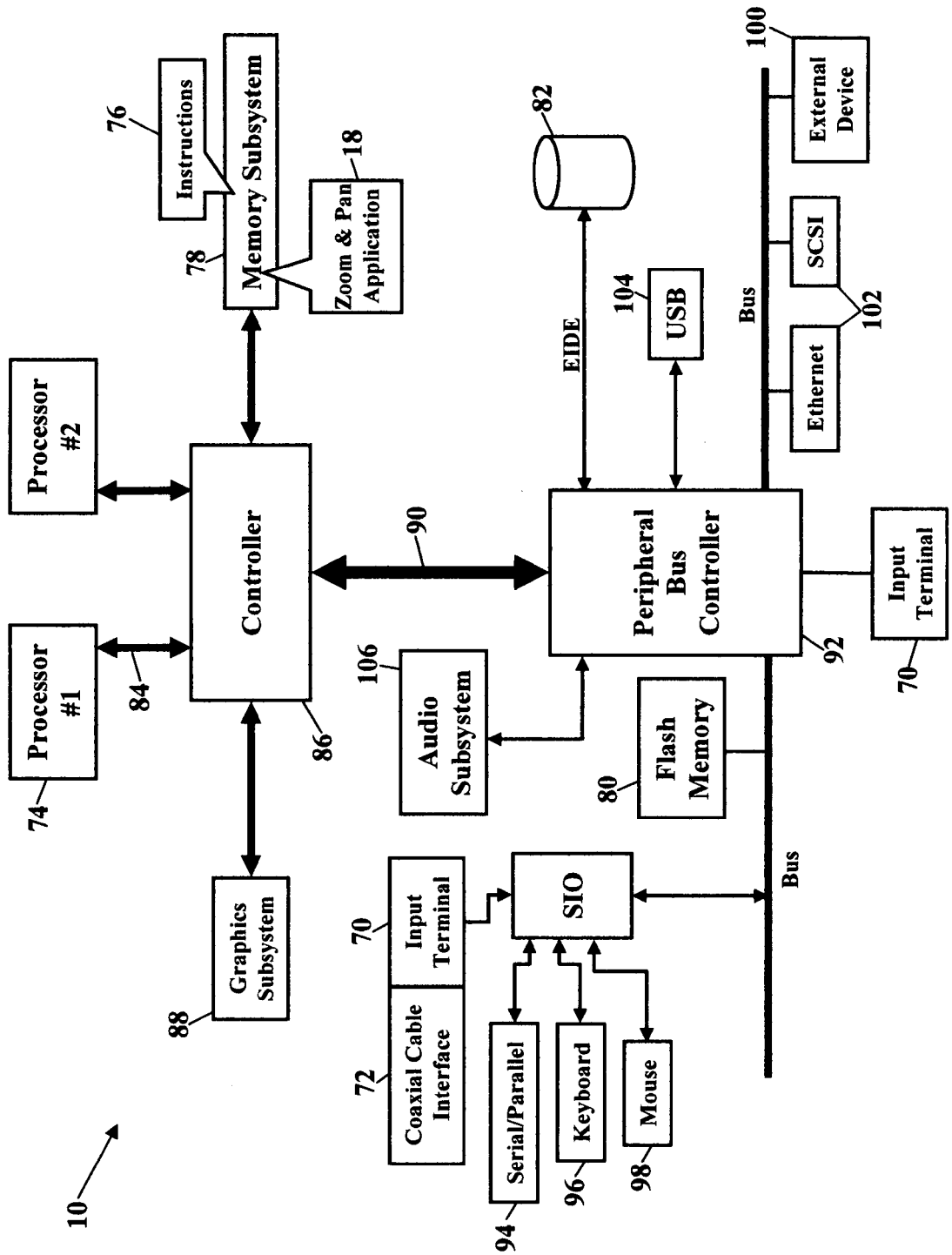
FIG. 10 is a block diagram illustrating a zoom and pan application residing in a computer system according to some of the embodiments.

FIG. 10 is a block diagram of exemplary details of the multimedia gateway device 10 shown in FIG. 1. The multimedia gateway device 10 can be any device, such as an analog/digital recorder, television, CD/DVD player/recorder, audio equipment, receiver, tuner, and/or any other consumer electronic device. The multimedia gateway device 10 may also include any computer, peripheral device, camera, modem, storage device, telephone, personal digital assistant, and/or mobile phone. The multimedia gateway device 10 may also be configured as a set-top box (shown as reference numeral 30 in FIGS. 2-6 and FIGS. 8-9) receiver that receives and decodes digital signals. The multimedia gateway device 10, in fact, can be any electronic/electrical device that has an input for receiving data streams. The input may include a coaxial cable interface 72 for receiving signals via a coaxial cable (not shown). The input may additionally or alternatively include an interface to a fiber optic line, to a telephone or data line (such as an RJ-11 or RJ-45), to other wiring, and to any male/female coupling. Further input/output combinations include wireless signaling such as Bluetooth, IEEE 802.11, or infrared optical signaling. The multimedia gateway device 10 includes one or more processors 74 executing instructions stored in a system memory device. The instructions, for example, are shown residing in a memory subsystem 78. The instructions, however, could also reside in flash memory 80 or a peripheral storage device 82. When the processor 74 executes the instructions, the processor 74 may also consult the zoom and pan application 18 stored in the system memory device. The processor 74, however, may additionally or alternatively consult the zoom and pan application 18 by communicating with the server, operating within the content distribution network, when conserving bandwidth (the server and the communications network are shown, respectively, as reference numerals 28 and 14 in FIGS. 1-9). The one or more processors 74 may also execute an operating system that controls the internal functions of the multimedia gateway device 10. A bus 84 may communicate signals, such as data signals, control signals, and address signals, between the processor 74 and a controller 86. The controller 86 provides a bridging function between the one or more processors 74, any graphics subsystem 88 (if desired), the memory subsystem 78, and, if needed, a peripheral bus 90. The peripheral bus 90 may be controlled by the controller 86, or the peripheral bus 90 may have a separate peripheral bus controller 92. The peripheral bus controller 92 serves as an input/output hub for various ports. These ports include an input terminal 70 and perhaps at least one output terminal. The ports may also include a serial and/or parallel port 94, a keyboard port 96, and a mouse port 98. The ports may also include networking ports 102 (such as SCSI or Ethernet), a USB port 104, and/or a port that couples, connects, or otherwise communicates with the multimedia gateway device 10 which may be incorporated as part of the multimedia gateway device 10 itself or which may be a separate, stand-alone external device 100. The multimedia gateway device 10 may also include an audio subsystem 106, which may, for example, produce sound through an embedded speaker in a set-top box, and/or through the audio system of a television. The multimedia gateway device 10 may also include a display device (i.e., LED, LCD, plasma, and other display devices) to present instructions, messages, tutorials, and other information to a user using an embedded display. Alternatively, such instructions, may be presented using the screen of a television or other display device. The multimedia gateway device 10 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

The processors 74 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other components that are described in this patent. Those of ordinary skill in the art understand that this components may be implemented using any suitable design, architecture, and manufacture. Those of ordinary skill in the art, then understand that the exemplary embodiments are not limited to any particular manufacturer's component, or architecture, or manufacture.

The memory (shown as memory subsystem 78, flash memory 80, or peripheral storage device 82) may also contain an application program. The application program cooperates with the operating system and with a video display device to provide a Graphical User Interface (GUI). The graphical user interface provides a convenient visual and/or audible interface with a user of the multimedia gateway device 10. For example, a subscriber or authorized user, may access a GUI for selecting a higher resolution during activation of zoom or pan, such as image control command options 831, 832, 833, and 834 of FIG. 8. That is, the subscriber may select or otherwise configure a zoom and pan profile such that the zoom and pan application 18 consults the memory to access the zoom and pan profile and such that the zoom and pan profile provides instructions for selecting a resolution of the stream of data during activation of zoom or pan, to restore a lower resolution of the stream of data to conserve bandwidth, and/or to provide an alert or other notification to the multimedia gateway device 10.

Figure 11:
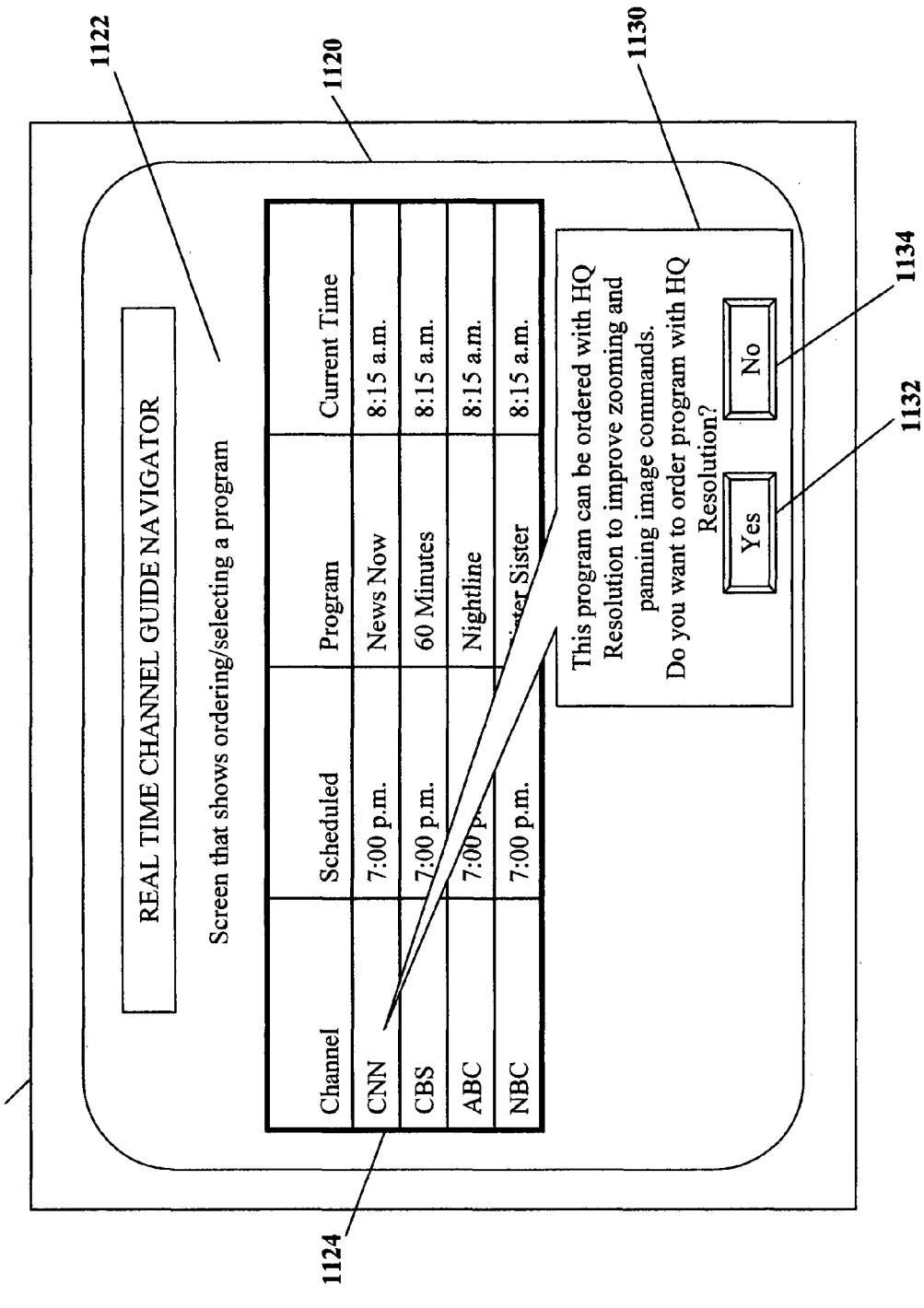
FIGS. 11-12 are schematics illustrating display prompts for image control selection according to some of the exemplary embodiments.
Figure 12:
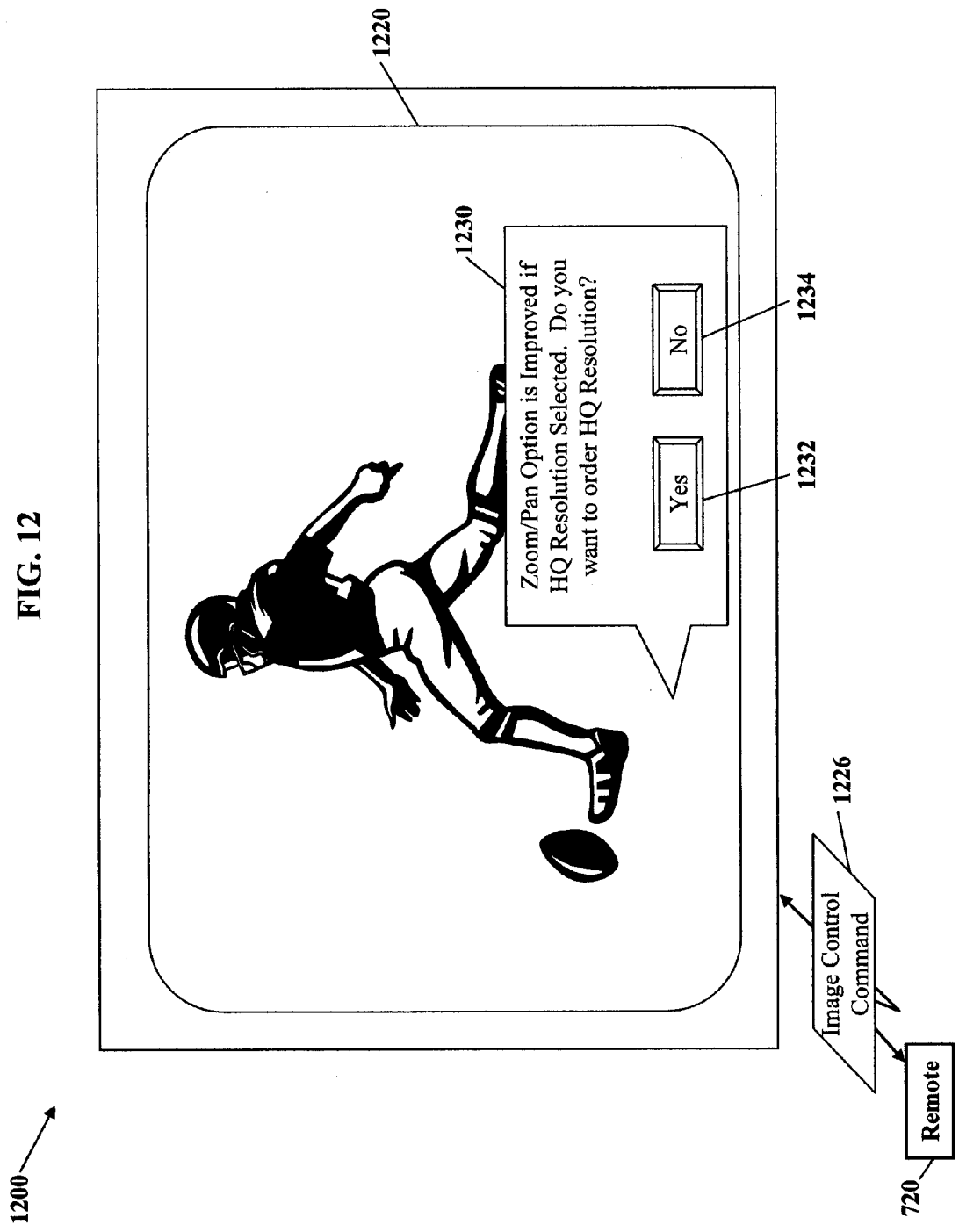

FIG. 11 is a schematic illustrating the notification 1130 displayed to the multimedia presentation device 16 that prompts the user to respond to the notification 1130 by selecting an affirmative response 1132 or a negative response 1134 for a higher resolution of a data stream if zoom and/or pan is activated. This notification 1130 may be presented prior to delivery of the media content to the multimedia presentation device 16. If the user does not respond, then the standard data stream 12 is presented as a default. Still further, if the standard data stream 12 is presented to the multimedia device 16, the user may still opt for a higher resolution of a data stream if zoom and/or pan is activated. For example, FIG. 12 illustrates a notification 1230 that is displayed to the multimedia presentation device 16 during presentation of the media content. When the zoom or pan command is detected, the user is prompted to respond to the notification 1230 by selecting an affirmative response 1232 or a negative response 1234 for a higher resolution of a data stream if zoom and/or pan is activated. If the user does not respond, then the standard data stream 12 is presented as a default.

The zoom and pan application may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the zoom and pan application to be easily disseminated. A computer program product for conserving bandwidth comprises the computer-readable medium, and the zoom and pan application stores on the computer-readable medium. The zoom and pan application comprises computer code for detecting an image control command to a multimedia device and for selectively distributing a data stream having an appropriate resolution associated with the image control command.

Figure 13:
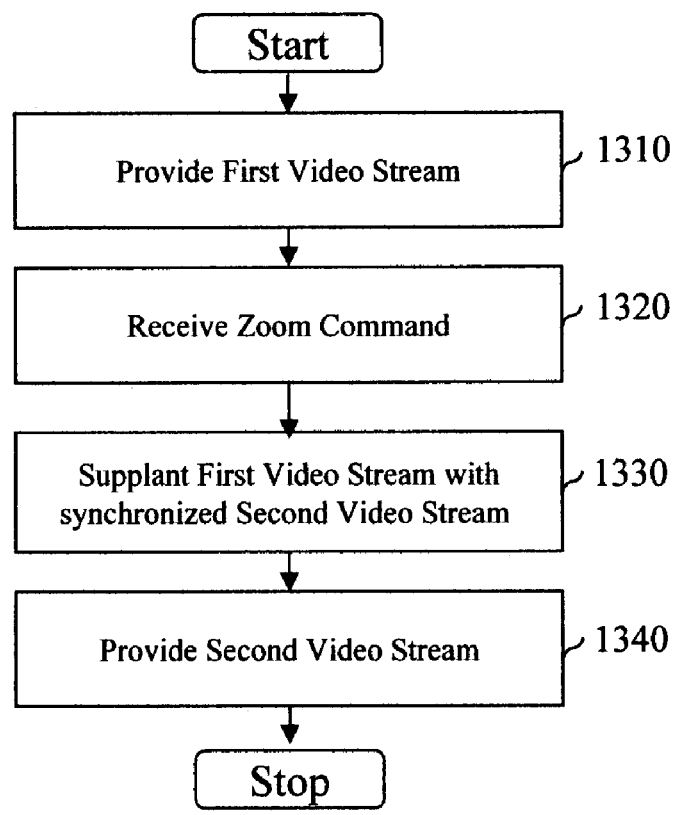
FIG. 13 is a flowchart illustrating an exemplary method for providing variable video stream resolutions to a multimedia device.

FIG. 13 is a flowchart illustrating an exemplary method for providing variable video stream resolutions to a multimedia device. A first video stream of images having a selected or default resolution is presented to a display device of a multimedia device (Block 1310). Thereafter, a zoom command to magnify a selected portion of the image is detected from the multimedia device. (Block 1320). In response to detecting the zoom command, the first video stream is supplanted with a second video stream having a synchronized sequence of zoomed frames corresponding to the selected image. (Block 1330). For example, if the second video stream has a higher image pixel density, then there is an x-dimension of an increased number of pixels for the selected portion of an image plane and a y-dimension of an increased number of pixels for the selected portion of the image plane. The second video stream is then provided to the display device. (Block 1340).

The zoom and pan application may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for providing variable video stream resolutions to a multimedia device, comprising:
   providing a first video stream having a sequence of frames of video data, each frame having an image plane with a predetermined image pixel density wherein the image pixel density comprises an x-dimension of a predetermined number of pixels and a y-dimension of a predetermined number of pixels;
   detecting a zoom command from the multimedia device, the zoom command comprising an instruction to magnify a selected portion of the image plane;
   supplanting the first video stream with a second video stream having a synchronized sequence of zoomed frames for the selected portion of image plane, each zoomed frame having a higher image pixel density than the predetermined pixel density of the first video stream for the selected portion of the image plane, wherein the higher image pixel density comprises an x-dimension of an increased number of pixels for the selected portion of the image plane and a y-dimension of an increased number of pixels for the selected portion of the image plane; and
   providing the second video stream.

2. The method of claim 1, further comprising:
   detecting a rotation command from the multimedia device, the rotation command comprising an instruction to alter a center position of the synchronized sequence of zoomed frames, the center position comprising a horizontal center and a vertical center.

3. The method of claim 2, further comprising:
refreshing the second video stream with a plurality of synchronized, sequential, rotation frames correlated with one or more of the zoomed frames, the rotation frames magnified in accordance with the zoom command such that visualization of one or more portions of the zoomed and rotated portion of the image plane comprises a zoomed, spherical-panorama presentation; and
providing the refreshed second video stream.

4. The method of claim 3, further comprising:
presenting the full resolution audio stream with the second video stream; and
continuing uninterrupted presentation of the full resolution audio stream with the refreshed second video stream.

5. The method of claim 3, further comprising:
presenting a restoration prompt to the multimedia device such that selection of the restoration prompt fully restores the image plane of the first video stream.

6. The method of claim 1, further comprising:
presenting a full resolution audio stream with the first video stream; and
continuing uninterrupted presentation of the full resolution audio stream with the supplanted second video stream.

7. The method of claim 1, further comprising:
providing a notification message simultaneously with the second video stream, the notification message comprising data associated with the zoom command.

8. The method of claim 7, further comprising:
discontinuing presentation of the notification message after a predetermined amount of time elapses from activation of the zoom command.

9. The method of claim 8, the predetermined amount of time comprising at least one second.

10. The method of claim 1, further comprising:
detecting a restoration command to restore the image plane of the first video stream and to discontinue magnification of the selected portion;
supplanting the second video stream with the first video stream; and
providing the first video stream.

11. The method of claim 10, further comprising:
presenting the full resolution audio stream with the second video stream; and
continuing uninterrupted presentation of the full resolution audio stream with the supplanted first video stream.

12. The method of claim 1, further comprising:
presenting a restoration prompt to the multimedia device such that selection of the restoration prompt fully restores the image plane of the first video stream.

13. A device, comprising:
a processor communicating with means for detecting a zoom command to a multimedia device,
the processor commanding delivery of a first stream of data to the multimedia device, and if the zoom command is activated, then the processor accessing a second stream of data for a zoomed image plane of the first stream of data, the second stream of data comprising a higher resolution of the zoomed image plane, and
the processor commanding delivery of the second stream of data to the multimedia device, such that delivery of the second stream of data conserves bandwidth.

14. The device of claim 13, the processor further for discontinuing delivery of the first stream of data during delivery of the second stream of data.

15. The device of claim 13, the processor further for degrading delivery of the first stream of data during delivery of the second stream of data.

16. The device of claim 13, the processor further communicating with means for detecting a rotational command to the multimedia device, and the processor refreshing the second stream of data with a plurality of synchronized, sequential, rotation frames associated with the zoomed image plane, such that visualization of one or more portions of the zoomed and rotated portion of the image plane comprises a zoomed, spherical-panorama presentation.

17. A computer-readable medium on which is encoded instructions for:
providing a first video stream having a sequence of frames of video data, each frame having an image plane with a predetermined image pixel density wherein the image pixel density comprises an x-dimension of a predetermined number of pixels and a y-dimension of a predetermined number of pixels;
detecting a zoom command from the multimedia device, the zoom command comprising an instruction to magnify a selected portion of the image plane;
supplanting the first video stream with a second video stream having a synchronized sequence of zoomed frames for the selected portion of image plane, each zoomed frame having a higher image pixel density than the predetermined pixel density of the first video stream for the selected portion of the image plane, wherein the higher image pixel density comprises an x-dimension of an increased number of pixels for the selected portion of the image plane and a y-dimension of an increased number of pixels for the selected portion of the image plane; and
providing the second video stream.

18. The computer-readable medium of claim 17, further comprising instructions for:
detecting a rotation command from the multimedia device, the rotation command comprising an instruction to alter a center position of the synchronized sequence of zoomed frames, the center position comprising a horizontal center and a vertical center.

19. The computer-readable medium of claim 18, further comprising instructions for:
refreshing the second video stream with a plurality of synchronized, sequential, rotation frames correlated with one or more of the zoomed frames, the rotation frames magnified in accordance with the zoom command such that visualization of one or more portions of the zoomed and rotated portion of the image plane comprises a zoomed, spherical-panorama presentation; and
providing the refreshed second video stream.

20. The computer-readable medium of claim 17, further comprising instructions for:
restoring the image plane of the first video stream.

* * * * *